United States Patent [19]

Lauck

[11] 4,230,730

[45] Oct. 28, 1980

[54] LEAVENING ACID COMPOSITION

[75] Inventor: Robert M. Lauck, New City, N.Y.

[73] Assignee: Stauffer Chemical Company, Westport, Conn.

[21] Appl. No.: 6,420

[22] Filed: Jan. 19, 1979

Related U.S. Application Data

[63] Continuation of Ser. No. 741,265, Nov. 12, 1976, abandoned.

[51] Int. Cl.$^3$ ............................ A21D 10/02; A21D 2/02
[52] U.S. Cl. ........................................ 426/128; 426/131; 426/551; 426/553; 426/563; 426/653
[58] Field of Search ............... 426/128, 131, 551, 553, 426/558, 563, 653

[56] References Cited

U.S. PATENT DOCUMENTS

| | | | |
|---|---|---|---|
| 2,550,491 | 4/1951 | McDonald | 426/551 |
| 3,205,073 | 9/1965 | Blanch et al. | 426/653 |
| 3,297,449 | 1/1967 | Baker et al. | 426/551 |
| 3,311,448 | 3/1967 | Blanch et al. | 423/306 |
| 3,411,872 | 11/1968 | Post et al. | 423/306 |
| 3,501,314 | 3/1970 | Kichline et al. | 426/653 X |
| 3,879,563 | 4/1975 | Tucker et al. | 426/128 |
| 4,054,678 | 10/1977 | Benjamin et al. | 426/563 X |

OTHER PUBLICATIONS

Stahl et al., *Symposium: Phosphates in Food Processing*, The AVI Publishing Co., Westport, Conn., (1971), pp. 194-212.

Tucker, "Phosphates in Foods", *Cereal Science Today*, 4(4), Apr. 1959, pp. 91-92.

*Primary Examiner*—Esther M. Kepplinger
*Attorney, Agent, or Firm*—Paul J. Juettner

[57] ABSTRACT

A new leavening acid composition is provided comprising a potassium modified 1:3:8 sodium aluminum phosphate, the calcium modified derivatives or mixtures thereof in combination with an alkali metal acid pyrophosphate such as sodium acid pyrophosphate. The leavening action of the combination in biscuits using a slow sodium acid pyrophosphate is slower than the action of either ingredient alone. The compositions are useful in leavening baked goods and especially refrigerated canned biscuits.

11 Claims, No Drawings

LEAVENING ACID COMPOSITION

This is a continuation of application Ser. No. 741,265 filed Nov. 12, 1976 now abandoned.

The present invention relates to an improved leavening acid system for use in baked goods and particularly for use in refrigerated canned dough compositions.

BACKGROUND OF THE PRESENT INVENTION

Refrigerated canned doughs are generally compositions packaged in foil surfaced fiber containers having vent holes or other means to allow gas to escape therefrom (U.S. Pat. Nos. 1,811,772 and 2,478,618). As the dough is proofed in the container, carbon dioxide is generated from the leavening system which expands the dough in the container and drives out the oxygen. The expanded dough seals the container. An internal gas pressure is required to maintain the seal and to keep the oxygen out of the container. The gas pressure must remain after refrigeration to maintain the seal. Failure to maintain the pressure will cause the dough to spoil due to bacteriological action which can spoil the biscuits and, in some instances, cause excessive gas pressure to be generated sufficient to cause the containers to rupture. The dough must also retain sufficient leavening to allow the product to rise when baked.

The leavening systems used in refrigerated canned doughs must be specifically adapted to satisfy certain criteria. The leavening system must develop gas at a slow enough rate initially to allow for mixing and handling. If too much gas is released during mixing, not enough will remain for sealing of the container (proofing). If a large amount of gas is generated after mixing but before the dough is placed in the can, the dough can puff causing problems in putting the proper dough weight into the container. After proofing, the containers must retain the internal pressure. Some leavening systems have been known to not maintain the pressure within the container upon refrigeration. In essence, the leavening system must provide the right amount of gas at various times from mixing to final baking.

Sodium acid pyrophosphate (hereinafter SAPP) has been been found to be especially well suited to the needs of preleavened packaged doughs and is widely used for that purpose. The addition of minor amounts of $K^+$, $Ca^{++}$, and $Al^{+++}$ to the SAPP during manufacture permits the controlled retardation of the rate of reaction of the SAPP with the sodium bicarbonate in the baking system (Phosphorus, A.D.F. Toy, Comprehensive Inorganic Chemistry, Vol. 2, Chapter 20, 1973). A SAPP/bicarbonate leavening system fulfills the gas generation requirements for canned doughs.

However, the so-called "pyro" taste generally is considered objectionable.

The so-called "pyro" taste has been described as (1) a sensation that there is a coating on the roof of the mouth, (2) an astringent aftertaste and (3) a dry feeling that persists on the teeth for several minutes. It would be desirable to reduce the quantity of "pyro" used while maintaining the good properties which the pyrophosphate provides.

Also, the sodium acid pyrophosphate is only sufficiently slow for use in preparing refrigerated doughs if a mixing temperature about 18°–21° C. (65°–70° F.) is maintained in the mixing bowl. This is accomplished by pumping a refrigerated liquid through a jacketed mixing bowl. Avoidance of the requirement would be a desirable improvement.

Another well known leavening agent in the baking industry is sodium aluminum phosphate (hereafter SALP). It finds use in baking powders, self-rising mixes, preleavened pancake flours and mixes, prepared biscuit mixes, and prepared cake mixes. (See U.S. Pat. Nos. 2,550,491, 3,109,738, 3,041,177, 3,096,178).

Crystalline sodium aluminum phosphate (or SALP) was first disclosed in the U.S. Pat. No. 2,550,490, and an early baking powder composition incorporating SALP was disclosed in U.S. Pat. No. 2,550,491. U.S. Pat. No. 2,550,490 specifically discloses a SALP with a Na:Al:PO$_4$ mole ratio of 1:3:8 (hereinafter 1:3:8 SALP). Since that time, several modifications of sodium aluminum phosphate have been developed which give different reactivities and performance characteristics. These include a dehydrated SALP, U.S. Pat. No. 2,957,750; a 3:3:8 SALP, U.S. Pat. No. 3,223,479; a 3:2:8 SALP U.S. Pat. No. 3,501,314, a 2:3:6 SALP, U.S. Pat. No. 3,574,536; an amorphous SALP, U.S. Pat. No. 2,995,421; a 3:3:9 SALP, U.S. Pat. No. 3,726,962 and a continuous crystallization of SALP, U.S. Pat. No. 3,311,448. The SALP's of commerce include 1:3:8 SALP and 3:2:8 SALP.

Several proposals have been made in the past for improving the properties of sodium aluminum phosphate, particularly the flow characteristics and dust properties.

In U.S. Pat. No. 3,205,073 to Blanch et al. there is provided a potassium modified sodium aluminum acid phosphate having decreased hygroscopicity. This result is accomplished by modifying the original sodium aluminum phosphate molecule before, during or after preparation with the introduction of potassium. The potassium is explained as replacing hydrogen atoms in the crystalline lattice of sodium aluminum phosphate. For example, in Example 8, Blanch et al. disclose the preparation of potassium modified sodium aluminum phosphate by reacting potassium hydroxide along with phosphoric acid and soda ash. An improvement over U.S. Pat. No. 3,205,073 is U.S. Pat. No. 3,411,872 to Post et al. which attempts to improve the flow characteristics of Blanch et al.'s potassium modified sodium aluminum phosphate by incorporating the potassium ions in a solvent suspension of an alkanol.

A further improvement in SALP is disclosed in U.S. application Ser. No. 671,769, filed Mar. 30, 1976 to R. Benjamin et al. In that application, a specific ratio of sodium and potassium is used to prepare a potassium modified SALP. The improved SALP product is characterized by increased density and reducing dusting properties. A calcium treated SALP having improved handling characteristics and useful as a leavening agent in moist doughs and liquid batters is disclosed in U.S. Application Ser. No. 703,872, filed July 9, 1976 to Benjamin et al. The calcium treated SALP can be prepared by contacting a slurry of SALP or potassium treated SALP with a calcium compound followed by granulating the calcium treated product while drying such that a majority of the granulated particles are less than 840 micron (through 20 mesh) and at least 90% less than 2000 micron. There is provided granulated complex aluminum phosphate granules with at least a calcium rich outer surface. These products, as leavening acids, show improved holding and storage characteristics in moist doughs and liquid batters.

While 1:3:8 SALP is a well known leavening acid with no flavor problems, the use of 1:3:8 SALP in canned biscuits to replace the SAPP to overcome the flavor problem has not been successful. 1:3:8 SALP has been considered "too fast" for canned doughs. Under normal processing conditions, the use of 1:3:8 SALP leads to failure due to the bursting of cans caused by bacterial growth. Proper internal pressure cannot be maintained after refrigeration. SALP (slow acting) or 3:2:8 SALP, has been used in combination with SAPP at a 25/75 percent ratio of a refrigerated dough containing large amounts of solid shortening (U.S. Pat. No. 3,879,563). The biscuits are taught to be more of the homemade variety. Since the 3:2:8 SALP is slower acting than the other commercially available SALP, the 1:3:8 SALP, and since SAPP is known to be faster than either SALP, the combination of 3:2:8 SALP and SAPP does not provide teachings on how to overcome the problem of using 1:3:8 SALP in refrigerated canned doughs.

Potassium sorbate can also be added as a dough conditioner. The potassium sorbate apparently decreases mixing time and apparently increases the storage stability of the dough product (See U.S. Pat. No. 3,556,798).

It would be desirable to provide a leavening system which requires less SAPP. It would also be desirable to increase the effectiveness of 1:3:8 SALP as a leavening acid in refrigerated doughs.

BRIEF DESCRIPTION OF THE INVENTION

In accordance with the present invention, there is provided a new leavening acid composition which can be used in leavening canned refrigerated dough comprising a potassium modified 1:3:8 sodium aluminum phosphte or the calcium modified derivatives thereof or mixtures thereof in combination with an alkali metal acid pyrophosphate. Unexpectedly, this leavening acid in combination with sodium bicarbonate produced gas at a rate slower than at least the fastest ingredient and, in many cases, slower than either leavening acid ingredient separately. When using a slow sodium acid pyrophosphate, the combination meets the criteria for leavening acid for canned refrigerated doughs, namely low gas development upon mixing, ability to develop gas to seal the cans, and the ability to maintain pressure in the cans when refrigerated. This biscuit leavening acid combination is relatively insensitive to temperature and can be used at a dough temperature of up to about 26° C. (80° F.) thus eliminating the need for the extensive refrigeration of the mixing bowl as presently required. Since the leavening systems of the present invention provide a gas release rate which is slower than at least the fastest, and since 1:3:8 SALP and SAPP are available in various grades ranging from fast to slow, it is possible by the present invention to provide tailor-made leavening systems to satisfy the particular needs of a baking system.

DETAILED DESCRIPTION OF THE INVENTION

The alkali metal acid pyrophosphate used in the present invention can be either sodium or potassium acid pyrophosphate and mixtures thereof. The preferred pyrophosphate for use in the invention is sodium acid pyrophosphate, hereinafter SAPP, though this usage is not intended to be so limited but only for purposes of explanation.

SAPP is prepared by the controlled thermal decomposition of monosodium phosphate. By varying the conditions of humidity and temperature as well as the amount of cations added and the particle size during processing, SAPP's for varying reactivities can be prepared. Most of the commercially prepared SAPP's contain added minor amounts of $K^+$, $Ca^{++}$, and $Al^{+++}$. These additives permit the controlled retardation of the rate of reaction of the SAPP with the sodium bicarbonate in the baking system. (See Phosphorus, A.D.F. Toy, ibid).

It is preferred for use in the present invention in canned refrigerated doughs to utilize a slow acting SAPP such as SAPP No. 4, available from Stauffer Chemical Company, Westport, Connecticut. By slow is meant evolving less than 30% by weight of the total $CO_2$ at two minutes and less than 35% $CO_2$ after ten minutes in a doughnut dough reaction rate test at 27° C. (81° F.). The doughnut dough reaction rate test is an analytical method used for reactivity studies of baking acids. The test procedure involves reacting the acid (SAPP) with sodium bicarbonate while the reactants are suspended in a moist doughnut dough at a temperature of 27° C.±0.5° C. The proportions of acid (SAPP) and bicarbonate employed are those which are capable of theoretically liberating 200 cc. of $CO_2$ gas as 0° C. The remainder of the ingredients are outlined in a paper on reaction rate testing which appeared in Cereal Chemistry, Vol. 8, American Association of Cereal Chemists, St. Paul, Min., 1931, pp. 423–33. Other uses in other baked goods may require a faster leavening rate. In those instances, a SAPP with a different reactivity can be used. Medium reactivity rate SAPP's are also known which evolve less than about 34% $CO_2$ at two minutes and 40% $CO_2$ at ten minutes. Any SAPP's with reaction rate above the medium are considered fast. The differentiation between slow, medium and fast is approximate. Variation in definition is possible depending on interpretation. The characterization is generally intended only as guidelines for the selection of the proper SAPP for the desired end result. By varying the rate of reactivity of the SAPP used, the leavening system of the present invention can be tailored to a desired use. Also, refrigeration can be used to slow down the rate of gas release allowing for the use of a slightly faster grade of SAPP.

It is also known that the rate of gas release of SAPP is dependent on the calcium present in the mix. If the milk is removed from the product being made, such as milkless biscuits, a SAPP with a slower rate of gas release must be used. Variance in results can be noted because of a variance in the calcium content. These factors are easily determined by one skilled in the art.

The potassium-modified SALP which is used in the composition of the present invention can be prepared by any of a number of prior art processes such as those mentioned hereinbefore. Illustrative of these are Blanch et al., U.S. Pat. No. 3,205,073 and Blanch et al., U.S. Pat. No. 3,311,448.

However, it is preferred to utilize the potassium modified 1:3:8 SALP prepared in accordance with the process outlined in the copending application to Benjamin et al., ser. No. 671,769, filed Mar. 30, 1976 now U.S. Pat. No. 4,054,678. In accordance with this process, food grade phosphoric acid having a concentration of about 85.0 to about 88.0 weight percent $H_3PO_4$ is contacted with a sufficient amount of potassium ion to provide an analysis of about 0.5 to about 1.2 weight percent $K_2O$ in the final product, and a sufficient amount of sodium ion to provide an analysis of from about 2.4 to about 3.2 weight percent of Na₂O in the final product. This mixture is then treated with a sufficient amount of alumina to provide a concentration of from about 15% to about 17% by weight Al₂O₃ in the final product. The slurry thereby formed is cooled to a temperature within the range of from about 60° C. to about 75° C. The product is dried and granulated simultaneously. The product is ground and classified to obtain the following distribution:

On 60 mesh—from about 0.1% to about 5%
Through 60/On 100 mesh—from about 3% to about 20%
Through 100/On 140 mesh—from about 9% to about 50%

The product formed by this process is a potassium modified SALP having the approximate formula:

$$Na_{(a)}K_{(b)}Al_3H_{14}(PO_4)_8 \cdot 4H_2O$$

wherein (a) is a number within the range of from about 0.64 and about 0.72 and (b) is a number within the range of from about 0.28 to about 0.36, the total of (a) and (b) being a number within the range of from about 0.92 to about 1.08. This is the preferred potassium modified SALP product for use in the composition of the invention. SALP's of this type are available from Stauffer Chemical Company under the trademark Levair.

SALP's with varying degrees of reactivity can be used to tailor make the leavening system to the requirements of a specific baking system.

The potassium modified SALP can also be further modified with calcium as disclosed in the copending application to Benjamin et al., Ser. No. 703,872, filed July 9, 1976. In the application, a slurry of the potassium modified SALP is contacted with a calcium compound followed by granulating the product while drying. This disclosure is incorporated by reference.

The foregoing are given as illustrative of the potassium modified 1:3:8 SALP's which can be used in the present invention. Any potassium modified 1:3:8 SALP or potassium modified 1:3:8 SAPP based product can be used. Formulated leavening acids based on potassium modified 1:3:8 SALP's are included within the scope of the present invention and the term potassium modified 1:3:8 SALP.

The potassium modified SALP is used in a ratio to the SAPP within the range of from about 3:1 to about 1:3. Preferably the ratio of within the range of from about 1.5:1 to about 1:1.5. Most preferably for refrigerated canned doughs, the ratio is 1:1. Other ratios may be more effective in other baking applications. Variation in the ratios are also possible depending on such factors as the reaction rate of the potassium modified SALP, and the amount of potassium present, as well as the reaction rate of the SAPP. For example, in doughnuts, a ratio of 50/50 SALP/SAPP using a SAPP with a fast reaction rate has been found to be effective. These factors can be easily determined by one skilled in the art. The ratios are based on the titratable neutralizing value of SAPP and of the potassium modified SALP leavening acids. The neutralizing value, sometimes called neutralizing strength, of a leavening acid represents the number kilograms of sodium bicarbonate which will be neutralized by 100 kilograms of the leavening acid. It is determined by titration of the acid and can be expressed:

$$NV = a/b \times 100$$

wherein a is the kilograms of sodium bicarbonate neutralized, and b is the kilograms of leavening acid required. The literature reports a neutralizing value for SALP of 100 and for SAPP of 72. The amount of each leavening acid required is determined by the amount needed to neutralize an amount of sodium bicarbonate equivalent to the ratio of the leavening acid. In other words, if the SALP/SAPP were used in a 50/50 ratio, the total amount of sodium bicarbonate would be divided in half and the amount of leavening acid needed to neutralize that amount of sodium bicarbonate would be computed based on the neutralizing value of the acid.

The leavening acid compositions of the present invention can be formed by dry blending the potassium modified SALP and the SAPP. This insures the intimate association of the materials. The compositions can also be prepared in situ in the baked goods by blending the potassium modified SALP and the SAPP with the flour and other ingredients of the baked good.

The leavening acid compositions of the present invention can be used to leaven any baked product presently using SALP or SAPP. In particular, the leavening acid system of the present invention can be used to replace, on a one for one basis, the SAPP presently used in baking application such as biscuits, doughnuts and the like. The gas producing agent used in the formulations is generally sodium bicarbonate.

The procedure for preparing the baked goods using the leavening acids of the present invention can be the standard procedures normally connected with that product.

Illustrative of baked goods which can benefit from the leavening systems of the present invention are biscuits, doughnuts, cakes, sweet doughs and the like and mixes used in their preparation. The preferred areas of use include biscuits and doughnuts. Also included are self-rising flour and pancake mixes. When using a slow SAPP, the leavening systems of the present invention are particularly advantageous for use in canned refrigerated biscuits which require a low gas generation during mixing and canning, the ability to develop pressure to seal the can upon proofing and the ability to maintain the pressure in the can under refrigeration. These requirements can be met by the leavening acid systems of the present invention. In doughnuts, effective leavening is accomplished using a fast SAPP such as DONUT PYRO, available from Stauffer Chemical Company, Westport, Connecticut.

Biscuits are generally prepared from flour, sugar, salt, shortening, a leavening system of alkaline bicarbonate such as sodium or potassium bicarbonate and a leavening acid, water, and optionally, milk solids. Additional components in minor amounts can include flavor and color agents, nutrient supplements, preservatives, antioxidants and reducing agents. In addition to the leavening acids of the present invention, small amounts of other leavening acids can be added to further provide for a wide range of leavening activity for any use desired. Illustrative acids suitable for such use in the biscuits include glucono delta lactone, sodium aluminum phosphate hydrate, sodium aluminum phosphate anhydride anhydrous monocalcium phosphate, monocalcium phosphate monohydrate, monosodium phosphate, alphaglucoheptonogamma-lactone, mixtures thereof and the like. These additives are also useful in areas other than biscuits where the present invention finds utility. Any other ingredients normally used in biscuits can be incorporated as desired.

The present invention will be more fully illustrated in the examples which follow. Conversions to the metric system of measurement are approximate.

Footnote references in the examples all relate to the same footnote which is defined at the point of first reference.

EXAMPLES 1–8

Examples 1–5

Milkless canned refrigerator biscuits were prepared using the following formulation:

| 1. A Mix | Flour | 550 grams |
|---|---|---|
|  | Water | 330 milliliters |
| 2. B Mix | Sodium Bicarbonate | 11.34 grams |
|  | Salt | 12.4 grams |
|  | Sugar | 25.8 grams |
|  | Shortening | 36.1 grams |

| Leavening System | Examples 1 & 4 grams | Examples 2 & 5 grams | Example 3 grams |
|---|---|---|---|
| K modified SALP[1] | 8.5 | 5.67 | 2.84 |
| SAPP[2] | 3.74 | 7.88 | 11.81 |
| Flour | 53.3 | 52.2 | 51.10 |
| (Examples 4 and 5 were run later) | | | |

[1]Levair, Stauffer Chemical Company
[2]SAPP No. 4, Stauffer Chemical Company

Procedure:

The flour and water of the A mix were mixed together for one minute at speed No. 1 of a Hobart mixer type C-100 using a McDuffy bowl, which is jacketed bowl which can be cooled with cooling water. After one minute, the speed was increased to 2 and blended for an additional five minutes.

The leavening system was then blended with the B mix and the entire B mix (all dry ingredients) was sprinkled over the A mix dough. The shortening was then spread over the top of the dough and the entire mixture was blended for one minute at the first speed and four minutes at the second speed. After mixing, the dough temperature was recorded. The dough was then rolled, folded over and rolled again in a 0.7 centimeter (9/32 inch) sheeting roller. Ten biscuits with a total weight of within the range of from 230 to 233 grams and a diameter of 4.4 centimeters (1.75 inches) were cut. The tops of the biscuits were oiled, placed in a foil lined refrigerator biscuit can and sealed. The biscuits were proofed at 35° C. to 36.6° C. (95° F. to 98° F.). Pressure in the can was recorded every 15 minutes by testing the amount of pressure needed to deflect the can cover to a flat state. When can pressures within the range of 155 to 237 grams/sq. centimeter (15-23 lbs./sq. inch) was reached, the cans were placed in a refrigerator at about 1° C. (34° F.). Can pressure was checked again after a period of 1–4 days. A reduction in pressure to below 103 grams/sq. centimeter (10 lbs./sq. inch) is considered a failure. An increase in pressure after storage is normally caused by gas build up by bacterial action indicating spoilage.

The pressure determinations are reported in Table I below. Pressure determinations were taken on two cans and both figures are reported.

TABLE I

| Example | Formulation K-SALP Grams | Formulation SAPP Grams | Dough Temperature Mixing | Dough Temperature Final | Pressure in Cans, grams/cubic centimeter (pounds/sq. inch) After Canning in X minutes 15 | 30 | 45 | 60 | 75 | 90 | After Refrigeration 1 Day | After Refrigeration 4 Days |
|---|---|---|---|---|---|---|---|---|---|---|---|---|
| 1 | 8.5 | 3.94 | 24.4° C. (76° F.) | 24.4° C. (76° F.) | 41–52 (4–5) | 72–83 (7–8) | 93–103 (9–10) | 124–124 (12–12) | 134–155 (13–15) | 227–207 (22–20) | 62–72 (6–7) | 93–103 (9–10) |
| 2 | 5.67 | 7.88 | 24.4° C. (76° F.) | 24.4° C. (76° F.) | 41–52 (4–5) | 52–72 (5–7) | 72–103 (7–10) | 124–124 (12–12) | 145–155 (14–15) | 176–186 (17–18) | 124–155 (12–15) | 145–155 (14–15) |
| 3 | 2.54 | 11.81 | 23.9° C. (75° F.) | 24.4° C. (76° F.) | 41–62 (4–6) | 41–62 (4–6) | 103–145 (10–14) | 186–207 (18–20) | 258–269 (25–26) | — | 165–176 (16–17) | 155–165 (15–16) |
| 4 | 8.5 | 3.94 | 27.8° C. (82° F.) | 27.2° C. (81° F.) | 52–41 (5–4) | 62–72 (6–7) | 83–93 (8–9) | 124–103 (12–10) | 134–145 (13–14) | 207–217 (20–21) | — | 93–103* (9–10) |
| 5 | 5.67 | 7.88 | 28.3° C. (83° F.) | 28.3° C. (83° F.) | 41–52 (4–5) | 52–52 (6–5) | 93–103 (9–10) | 134–103 (13–10) | 186–165 (18–16) | 238–248 (23–24) | — | 134–145* (13–14) |

*3 Days

EXAMPLES 6–8

Control biscuits for Examples 1–5 were prepared by mixing the following formulation in accordance with the procedures given in Examples 1–5:

| A Mix | Flour | 550 grams |
|---|---|---|
|  | Water | 330 milliliters |
| B Mix | Flour | 50 grams |
|  | Sodium Bicarbonate | 12 grams |
|  | SAPP[2] | 16.7 grams |
|  | Salt | 13.2 grams |
|  | Sugar | 27.4 grams |
|  | Shortening | 38 grams |

The temperature in the cooling water was varied to determine the effect of mixing temperature on the leavening rate. These temperatures are reported in Table II. Proofing was conducted at 36.7° C. (98° F.).

The results are reported in Table II below.

TABLE II

| Example | Temperature Cooling Water | Temperature, Dough A Mix | Temperature, Dough Final | Pressure in Cans, Grams/cubic centimeter (Pounds/square inch) After Canning, X minutes 15 | 30 | 45 | 60 | After Refrigeration 1 Day |
|---|---|---|---|---|---|---|---|---|
| 6 | 14.5° C. (58° F.) | 18.9° C. (66° F.) | 19.2° C. (66.5° F.) | 8–9 | 9–10 | 12–13 | 25–26 | 18–20 |
| 7 | 22° C. (72° F.) | 25.6° C. (78° F.) | 25.6° C. (78° F.) | 14–16 | 16 (20 min) | — | — | 16–16 |
| 8 | 17° C. | 24.4° C. | 24.4° C. | | | | | |

TABLE II-continued

| Example | Temperature Cooling Water | Temperature, Dough A Mix | Temperature, Dough Final | Pressure in Cans, Grams/cubic centimeter (Pounds/square inch) After Canning, X minutes | | | | After Refrigeration 1 Day |
|---|---|---|---|---|---|---|---|---|
| | | | | 15 | 30 | 45 | 60 | |
| | (63° F.) | (76° F.) | (76° F.) | 9–6 | 18–19 | — | — | 18–20 |

After four days (three days for Examples 4 and 5), the biscuit cans were opened and the biscuits baked at 232° C. (450° F.) for 12 minutes. Also, a can of commercial biscuits was obtained and these biscuits were baked as a control. The commercial biscuits are listed as Example 9.

Biscuit bake tests and evaluation of the results therefrom is explained in Cereal Laboratory Methods, 6th Ed., American Association of Cereal Chemists, 1957 pp. 46–48. The results of the biscuit bakes including the initial dough temperature are reported in Table III.

The biscuit weight is the weight of seven biscuits just after baking. The six most evenly sloped biscuits are measured to provide biscuit height. The volume is determined by the number of cc's of rape seed displaced by six biscuits. Six weighed biscuits are placed in a cake pan and rape seeds are poured over the biscuits. The rape seeds are then leveled with the top of the pan. The rape seeds in the pan are poured off and their volume measured. By subtracting the value from the known volume of the entire pan, the volume of the biscuits can be determined. The specific volume is obtained by dividing the volume by biscuit weight. Dough weight and biscuit weight is in grams. The specific volume is an indicator of the relative lightness and fluffiness of the baked biscuits. Biscuits having a specific volume of less than 3.0 cubic centimeters per gram have been found to be unacceptable in comparison to a homemade biscuit. Therefore, the specific volume of the biscuits of this invention must be greater than 3.0 cc/gm.

Alkalinity is determined by breaking open a baked item and applying to either the cold or hot crumb a few drops of "Stauffer Special Indicator for Self-Rising Flour" available from Stauffer Chemical Company, Westport, Connecticut. The color which develops indicates the acidic or alkaline condition of the baked item using the following color code:

Magenta—Alkaline
Red—Slightly Alkaline
Red mottled with Yellow—Normal
Yellow mottled with Red—Slightly Acid
Yellow—Acidic The results are reported in Table III below.

TABLE III

| Example | Dough Temperature | Biscuit Weight grams | Height centimeters | Volume c.c. | Specific Volume | Alkalinity (Indication) |
|---|---|---|---|---|---|---|
| 1 | 24.4° C. (76° F.) | 136 | 20.3 (8 in.) | 460 | 3.38 | Slightly Alkaline |
| 2 | 24.4° C. (76° F.) | 149 | 17.8 (7 in.) | 500 | 3.36 | Slightly Alkaline |
| 3 | 24.4° C. (76° F.) | 146 | 19 (7.5 in.) | 500 | 3.42 | Slightly Alkaline |
| 4 | 27.2° C. (81° F.) | 147 | 19.7 (7.75 in.) | 490 | 3.33 | Slightly Alkaline |
| 5 | 28.3° C. (83° F.) | 145 | 19.7 (7.75 in.) | 500 | 3.45 | Slightly Alkaline |
| 6 (Control) | 19.1° C. (66.5° F.) | 149 | 20.3 (8 in.) | 530 | 3.56 | Very slightly Alkaline |
| 7 (Control) | 25.6° C. (78° F.) | 150 | 19 (7.5 in.) | 500 | 3.33 | Very slightly Alkaline |
| 8 (Control) | 24.4° C. (76° F.) | 140 | 19 (7.5 in.) | 510 | 3.64 | Very slightly Alkaline |
| 9* Control | — | 145 | 20.3 (8 in.) | 540 | 3.72 | Normal |

*Commercial biscuits

Examples 10–16

Biscuits were prepared using various SALP's in combination with SAPP. The following formulation and the mixing procedure of Example 1 was used:

| A Mix | Flour | 550 grams |
|---|---|---|
| | Water | 330 milliliters |
| B Mix | Sodium Bicarbonate | 11.34 grams |
| | Flour | 52.2 grams |
| | Salt | 12.4 grams |
| | Sugar | 15.8 grams |
| | Dextrose | 10 grams |
| | SAPP[2] | 7.88 grams |
| | SALP* (See below) | 5.67 grams |
| | Shortening | 36.1 grams |

| SALP Example | *SALP |
|---|---|
| 10 | Potassium Modified SALP (Levair) |
| 11 | Potassium Modified SALP (second sample of Levair) |
| 12 | Potassium Modified SALP (third sample of Levair) |
| 13 | Agglomerated SALP |
| 14 | Calcium modified potassium modified SALP. |
| 15 | High sodium potassium modified SALP |
| 16 | 3:2:8 SALP |

The biscuits were prepared using a cooling water temperature of 19° C. (66° F.) and proofed at 36.7° C. (98° F.). The results are reported in Table IV below:

TABLE IV

| Example | Dough Temperature A Mix | Dough Temperature Final | Pressure in cans, grams/cubic centimeter (pounds/sq. inch) After canning, in X minutes 15 | 30 | 45 | 60 | 75 | 90 | 105 | After refrigeration 1 day | After refrigeration 7 day |
|---|---|---|---|---|---|---|---|---|---|---|---|
| 10 | 25.6° C. (78° F.) | 26° C. (79° F.) | 41–41 (4–4) | 62–72 (6–7) | 103–113 (10–11) | 145–155 (14–15) | 186–165 (18–16) | 196–207 (19–20) | 207–227 (20–22) | 165–155 (16–15) | 258 (25) |
| 11 | 26° C. (79° F.) | 26° C. (79° F.) | 41–41 (4–4) | 83–83 (8–8) | 103–93 (10–9) | 134–165 (13–16) | 186–186 (18–18) | 217–227 (21–22) | — | 134–124 (13–12) | 269 (26) |
| 12 | 26° C. (79° F.) | 26° C. (79° F.) | 41–41 (4–4) | 52–52 (5–5) | 83–93 (8–9) | 113–124 (11–12) | 165–165 (16–16) | 186–196 (18–19) | 248–248 (24–24) | 124–165 (12–16) | 258 (25) |
| 13 | 26° C. (79° F.) | 26° C. (79° F.) | 41–41 (4–4) | 72–72 (7–7) | 83–103 ( 8–10) | 176–145 (17–14) | 196–196 (19–19) | 227–217 (22–21) | — | 164–164 (16–16) | 299 (29) |
| 14 | 26° C. (79° F.) | 26° C. (79° F.) | 41–41 (4–4) | 41–62 (4–6) | 83–83 (8–8) | 103–124 (10–12) | 124–165 (12–16) | 155–155 (15–15) | 207–207 (20–20) | 155–155 (15–15) | 278 (27) |
| 15 | 26° C. (79° F.) | 26° C. (79° F.) | — | 103–124 (10–12) | 145(14) one popped* | 227(22) | — | — | — | 134 (13) | 258 (25) |
| 16 | 26° C. (79° F.) | 26° C. (79° F.) | 41–52 (4–5) | 41–52 (4–5) | 72–83 (7–8) | 145–124 (14–12) | 238–227 (23–22) | | | 155–165 (15–16) | 309 (30) |

*improper lid sealing.

The biscuit of Examples 10–14 and 16 were baked in a 252° C. (450° F.) oven for 12 minutes. All had good taste. The results of the bake are reported in Table V below:

| A Mix | Flour | 550 grams |
|---|---|---|
| | Water | 330 milliliters |
| B Mix | Flour | 3.31 grams |

TABLE V

| Example | Biscuit Weight (7) grams | Biscuit Height (6) centimeters | Biscuit Volume c.c. | Specific Volume | pH | Alkalinity |
|---|---|---|---|---|---|---|
| 10 | 154 | 19.7 (7.75) | 530 | 3.44 | 7.86 | Slightly Alkaline |
| 11 | 150 | 17.8 (7) | 480 | 3.20 | 7.92 | Slightly Alkaline |
| 12 | 144 | 18.4 (7.25) | 515 | 3.58 | 8.02 | Slightly Alkaline |
| 13 | 141 | 18.1 (7.125) | 465 | 3.30 | 7.91 | — |
| 14 | 150 | 19.1 (7.5) | 505 | 3.37 | 8.01 | Moderately Alkaline |
| 16 | 143 | 18.4 (7.25) | 480 | 3.36 | 7.89 | Slightly Alkaline |

Examples 17–35

In the biscuit dough rate of release tests conducted in connection with the leavening acids of the present invention, the following formulation was used:

| Sodium Bicarbonate | .75 grams |
|---|---|
| Salt | .82 grams |
| Dextrose | .64 grams |
| Sucrose | 1.07 grams |
| Leavening Acid (See Table VI) | |
| Shortening | 2.4 grams |

The leavening acid is reported in Table VI below.

TABLE VI

| Example | Leavening Acid Type Acid | Weight Ratio | Amount Grams SALP | Amount Grams SAPP | Flour Grams |
|---|---|---|---|---|---|
| 17 | None (Na Bicarbonate)** | — | 0.75 | — | — |
| 18 | 1:3:8 SALP*/SAPP² | 50/50 | 0.375 | 0.52 | — |
| 19 | 1:3:8 SALP*/SAPP² | 50/50 | 0.375 | 0.52 | — |
| 20 | SAPP² | — | — | 1.04 | — |
| 21 | 1:3:8 SALP | — | 0.75 | — | 0.29 |
| 22 | SAPP² (50%) | — | — | 0.52 | — |
| 23 | 1:3:8 SALP* (50%) | — | 0.375 | — | — |
| 24 | 3:2:8 SALP | — | 0.75 | — | 0.29 |
| 25 | 3:2:8 SALP/SAPP² | 50/50 | 0.375 | 0.52 | 0.29 |
| 26 | 1:3:8 SALP* | — | 0.75 | — | 0.29 |
| 27 | 1:3:8 SALP*/SAPP² | 50/50 | 0.375 | 0.52 | — |
| 28 | Agglomerated SALP | — | 0.75 | — | 0.29 |
| 29 | Agglomerated SALP/SAPP² | 50/50 | 0.375 | 0.52 | — |
| 30 | Calcium Mod. SALP | — | 0.75 | — | 0.29 |
| 31 | A Mod. SALP/SAPP² | 50/50 | 0.375 | 0.52 | — |
| 32 | High Na SALP | — | 0.75 | — | 0.29 |
| 33 | High Na SALP/SAPP² | 50/50 | 0.375 | 0.52 | — |
| 34 | Coarse SALP | — | 0.75 | — | 0.29 |

TABLE VI-continued

| Example | Type Acid | Leavening Acid Weight Ratio | Amount Grams SALP | Amount Grams SAPP | Flour Grams |
|---------|-----------|------------------------------|-------------------|-------------------|-------------|
| 35 | Coarse SALP/SAPP | 50/50 | 0.375 | 0.52 | — |

*Potassium Modified SALP - Levair
**Na Bicarbonate alone.

The rates of gas release of the leavening systems of the invention in biscuit dough were evaluated in a biscuit dough rate of release test. The biscuit dough reaction rate test is an analytical method used for reactivity studies of baking acids. The test procedure involves reacting the leavening acid with sodium bicarbonate while the reactants are suspended in a moist biscuit dough in a sealed bomb equipped with a mixer having split rubber hose agitators and a recording device at a temperature of 27° C.±0.5° C. The proportions of acid and bicarbonate employed are those which are capable of theoretically liberating 200 cc. of $CO_2$ gas at 0° C. The basic concepts of the test are outlined in a paper on reaction rate testing which appeared in Cereal Chemistry, Vol. 8, American Association of Cereal Chemists, St. Paul, Minn., 1931, pp. 423–33.

Procedure:

The flour and water were mixed together using the procedure outlined in Example 1. The dough was placed in a plastic bag with a twist closure. The bag was placed in a 27°±0.5° C. water bath.

58.18 grams of the dough were weighed out and placed in the bomb. The B-mix as outlined hereinbefore was then sprinkled over the dough. Finally, the shortening was evenly distributed over the dough. The mixture was sealed in the bomb and placed in a 27° C.±0.5° C. water bath. The recording device was activated to record the gas evolved. The mixer was started. Mixing was continued for four minutes. The gas evolved in the first 15 minutes, reported in milliliters, was recorded and reported at intervals of 1, 2, 4 and 14 minutes. The first four minutes are equivalent to the mixing time, and the last ten minutes are equivalent to the time on the bench during rolling and packaging. Also reported is the difference between a blank with only sodium bicarbonate and no leavening acid. This number indicates the amount of gas provided by the use of the leavening acid.

The results are reported in Table VII which follows, Examples 17–25 were run on a different day than examples 26–35.

TABLE VII

| | | Milliliters of Gas Released | | | | | | | | |
|---|---|---|---|---|---|---|---|---|---|---|
| Example | Type Acid | 1 | Δ1 | 2 | Δ2 | 4 | Δ4 | 14 | Δ14 | Change 4–14 |
| 17 | None | 12 | — | 20 | — | 28 | — | 26 | — | −2 |
| 18 | 1:3:8 SALP*/SAPP² | 17 | 5 | 31 | 11 | 45 | 17 | 53 | 27 | 8 |
| 19 | 1:3:8 SALP*/SAPP² | — | — | 32 | 12 | 46 | 18 | 52 | 26 | 6 |
| 20 | SAPP² | 17 | 5 | 31 | 11 | 49 | 21 | 81 | 55 | 32 |
| 21 | 1:3:8 SALP | 12 | 0 | 30 | 10 | 58 | 30 | 69 | 43 | 11 |
| 22 | SAPP² (50%) | 16 | 4 | 26 | 6 | 35 | 7 | 56 | 20 | 21 |
| 23 | 1:3:8 SALP* (50%) | 12 | 0 | 28 | 8 | 41 | 13 | 42 | 16 | 1 |
| 24 | 3:2:8 SALP | 19 | 7 | 26 | 6 | 37 | 9 | 36 | 10 | −1 |
| 25 | 3:2:8 SALP/SAPP² | 18 | 6 | 26 | 6 | 38 | 10 | 40 | 14 | 2 |
| | | Minutes | | | | | | | | |
| Example | Type Acid | 1 | Δ1 | 2 | Δ2 | 4 | Δ4 | 14 | Δ14 | 4–14 |
| 26 | 1:3:8 SALP* | 23 | 11 | 42 | 22 | 61 | 33 | 73 | 47 | 12 |
| 27 | 1:3:8 SALP*/SAPP² | 15 | 3 | 28 | 8 | 47 | 19 | 56 | 30 | 9 |
| 28 | Agglomerated SALP | 20 | 8 | 32 | 12 | 48 | 20 | 61 | 35 | 13 |
| 29 | Agglomerated SALP/SAPP² | 15 | 3 | 27 | 7 | 42 | 14 | 64 | 38 | 22 |
| 30 | Calcium Mod. SALP | 20 | 8 | 36 | 16 | 49 | 21 | 58 | 32 | 9 |
| 31 | A Mod. SALP/SAPP² | 15 | 3 | 26 | 6 | 39 | 11 | 117 | 21 | 8 |
| 32 | High Na SALP | 24 | 12 | 39 | 19 | 60 | 32 | 70 | 44 | 10 |
| 33 | High Na SALP/SAPP² | 20 | 8 | 31 | 11 | 43 | 15 | 66 | 40 | 23 |
| 34 | Coarse SALP | 23 | 11 | 38 | 18 | 54 | 26 | 63 | 37 | 9 |
| 35 | Coarse SALP/SAPP² | 19 | 9 | 30 | 10 | 42 | 14 | 52 | 26 | 10 |

*Potassium Modified SALP - Levair

As can be seen from the data of Table VII, 1:3:8 SALP (Example 21) does not release a sufficient amount of gas during the 4–14 minute stage to make it difficult to put the dough in the cans. Further, 1:3:8 SALP will proof biscuits. However, 1:3:8 SALP will not maintain the pressure in the can under refrigeration. However, the rates of the 1:3:8 SALP/SAPP blend are slower (Examples 18 and 19) than the rate of the 1:3:8 SALP alone (Example 21) or the slow SAPP alone (Examples 20). The use of ½ of the amount of the slow SAPP (Example 22) provides approximately the same final amount of gas as the formulation of the invention. However, the gas is developed in the 4–14 minute period indicating puffing on the bench. The use of ½ of the amount of SALP (Example 23) provides about the same rate of gas release as the full amount of 3:2:8 SALP alone. However, 3:2:8 SALP alone will not proof the biscuits in the can.

In contrast, the combination of 3:2:8 SALP and slow SAPP (Example 25) provides apparently no change or even a slight increase in gas release over 3:2:8 SALP alone relative to the 4–14 minute rate. However, the combination of 3:2:8 SALP and slow SAPP will proof the biscuits in the can whereas 3:2:8 SALP alone will not.

From these data, it can be seen that the combination of 1:3:8 SALP and slow SAPP unexpectedly provides a slower gas release rate during mixing and canning than either product alone. This effect has not been noted in connection with 3:2:8 SALP. By this discovery, 1:3:8 SALP can be adapted for use in leavening refrigerated canned biscuits. The pyro taste problem can also be reduced by reducing the quantity of sodium acid pyrophosphate required to leaven the biscuits.

The invention is defined in the claims which follow. What is claimed is:

1. A leavening acid composition comprising:
  (a) a sodium aluminum phosphate derivative selected from the group consisting of a potassium modified 1:3:8 sodium aluminum phosphate, the calcium modified derivatives thereof prepared by contacting a slurry of said potassium modified sodium aluminum phosphate with a calcium compound followed by granulating the product while drying and mixtures thereof; in combination with
  (b) a slow alkali metal acid pyrophosphate having a doughnut dough rate of reaction of less than 30% $CO_2$ evolved after two minutes and less than 35% evolved $CO_2$ after ten minutes at 27° C.

2. The leavening acid composition as recited in claim 1 wherein said alkali metal acid pyrophosphate is sodium acid pyrophosphate.

3. The leavening acid composition as recited in claim 1 wherein said potassium modified 1:3:8 sodium aluminum phosphate is a composition of the approximate formula:

$$Na_{(a)}K_{(b)}Al_3H_{14}(PO_4)_8 \cdot 4H_2O$$

wherein (a) and (b) are numbers and the additive total of (a) and (b) is a number within the range of from about 0.92 to about 1.08.

4. The leavening acid composition as recited in claim 3 wherein (a) is a number within the range of from about 0.64 to about 0.72 and (b) is a number within the range of from about 0.28 to about 0.36.

5. The leavening acid composition as recited in claim 1 wherein the ratio of said potassium modified 1:3:8 sodium aluminum phosphate to said alkali metal acid pyrophosphate is within the range of from about 3:1 to about 1:3.

6. The leavening acid composition as recited in claim 5 wherein said ratio is within the range of from about 1.5:1 to about 1:1.5.

7. The leavening acid composition as recited in claim 1 wherein said sodium aluminum phosphate is the calcium modified derivative of a potassium modified sodium aluminum phosphate of the approximate formula:

$$Na_{(a)}K_{(b)}Al_3H_{14}(PO_4)_8 \cdot 4H_2O$$

wherein (a) and (b) are numbers and the additive total of (a) and (b) is a number within the range of from about 0.92 to about 1.08.

8. In a method for preparing biscuits which are leavened with the aid of a leavening acid, the improvement which comprises using for at least a portion of said acid the composition of claim 1, the total amount of said leavening acid and said composition being in an amount sufficient to leaven said biscuits.

9. In a method for preparing canned refrigerated dough which is leavened with the aid of a leavening acid, the improvement which comprises using for at least a portion of said acid, the product of claim 1, the total amount of said leavening acid and said composition being in an amount sufficient to leaven canned refrigerated dough.

10. A canned refrigerated dough using for at least a portion of the leavening acid therefor, the composition of claim 1, the total amount of said leavening acid and said composition being in an amount sufficient to leaven said canned refrigerated dough.

11. A leavening acid composition comprising:
  (a) a calcium modified derivative of a potassium modified sodium aluminum phosphte of the approximate formula:

$$Na_{(b)}K_{(b)}Al_3H_{14}(PO_4)_8 \cdot 4H_2O$$

wherein (a) and (b) are numbers and the additive total of (a) and (b) is a number within the range of from about 0.92 to about 1.08; in combination with
  (b) a fast alkali metal acid pyrophosphate having a doughnut dough rate of reaction greater than 34% evolved $CO_2$ after two minutes and greater than 40% evolved $CO_2$ after ten minutes at 27° C.

* * * * *

UNITED STATES PATENT AND TRADEMARK OFFICE
CERTIFICATE OF CORRECTION

PATENT NO. : 4,230,730

DATED : October 28, 1980

INVENTOR(S) : Robert M. Lauck

It is certified that error appears in the above—identified patent and that said Letters Patent is hereby corrected as shown below:

Col. 2, line 53 - change "reducing" to "reduced".

Col. 11, 1st paragraph under Table IV at line 2 thereof change "252°" to "232°".

Col. 16, line 34 - change "phosphte" to "phosphate".

Col. 16, line 37 (formula), change "$Na_{(b)}$" to "$Na_{(a)}$".

Signed and Sealed this

Nineteenth Day of May 1981

[SEAL]

Attest:

RENE D. TEGTMEYER

*Attesting Officer*    *Acting Commissioner of Patents and Trademarks*